Dec. 5, 1950      O. D. PREMO      2,532,329
ANGLE LAYOUT AND CHECKING INSTRUMENT
Filed March 28, 1947      3 Sheets-Sheet 1
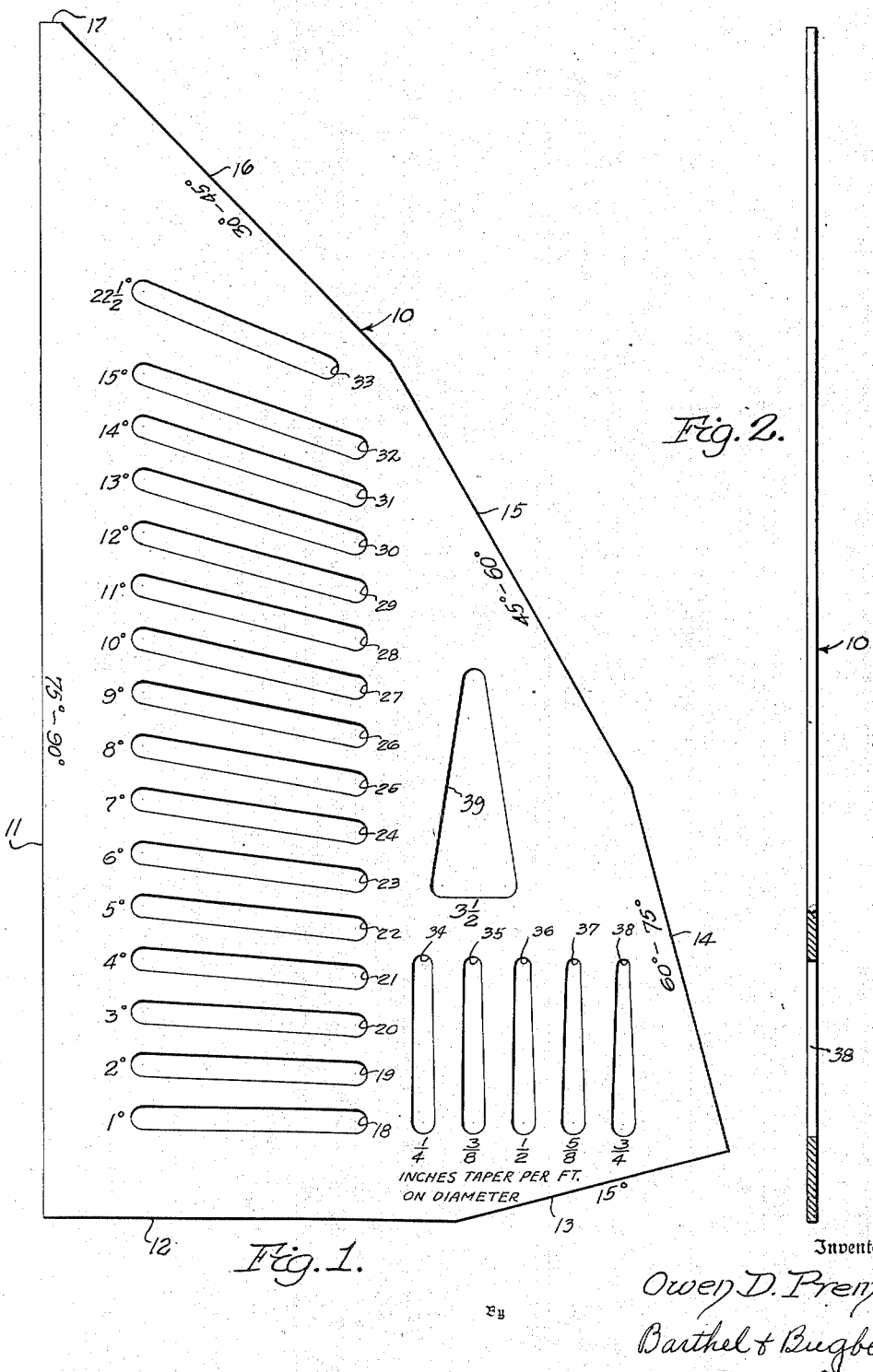
Inventor
Owen D. Premo
Barthel & Bugbee
Attorneys Dec. 5, 1950 — O. D. PREMO — 2,532,329
ANGLE LAYOUT AND CHECKING INSTRUMENT
Filed March 28, 1947
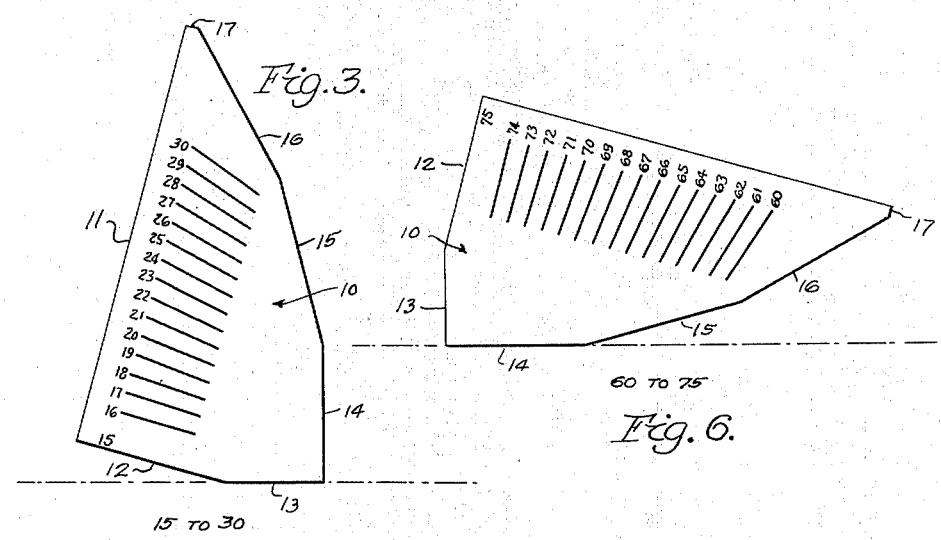
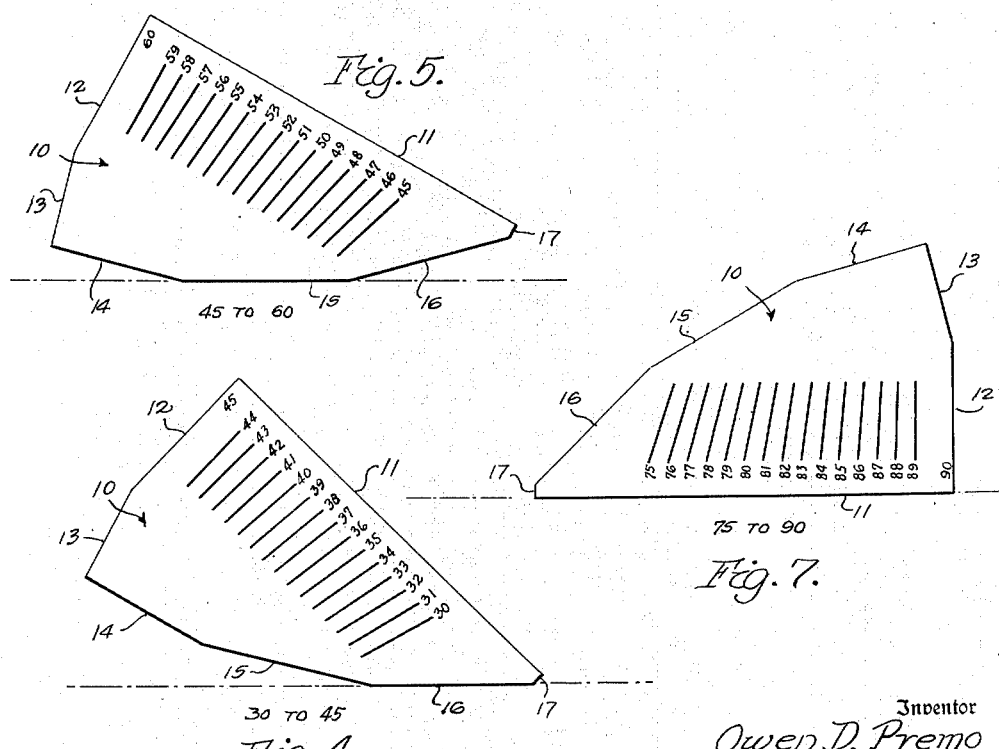
Inventor
Owen D. Premo
Barthel & Bugbee
Attorneys Dec. 5, 1950      O. D. PREMO      2,532,329
ANGLE LAYOUT AND CHECKING INSTRUMENT
Filed March 28, 1947      3 Sheets-Sheet 3
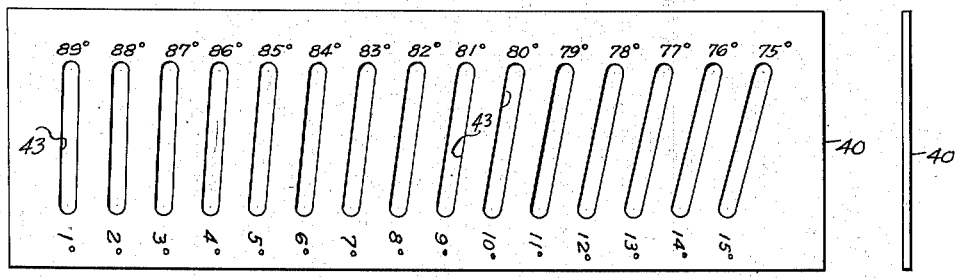
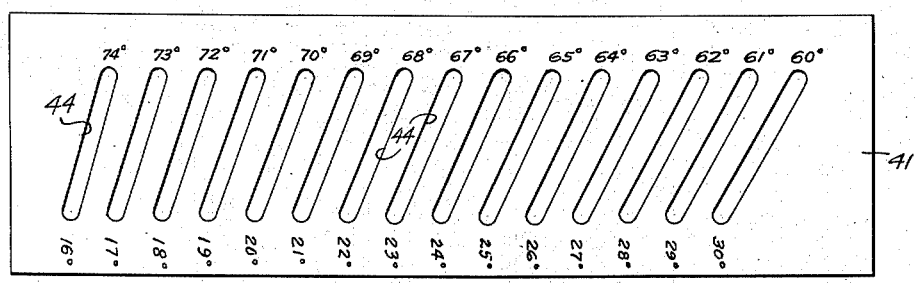
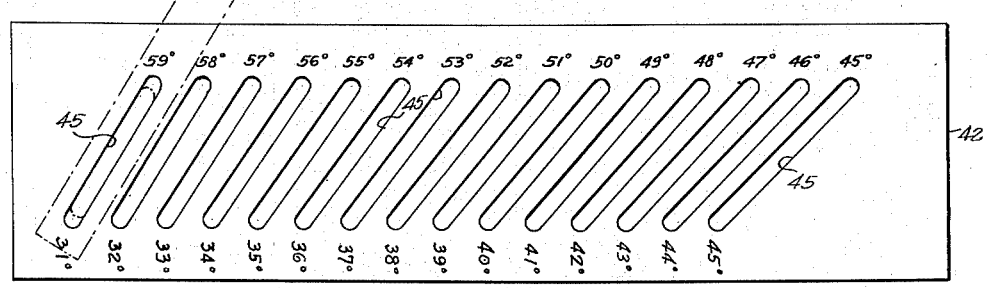
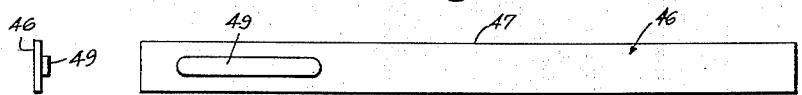
Inventor
Owen D. Premo
Barthel & Bugbee
Attorneys Patented Dec. 5, 1950

2,532,329

UNITED STATES PATENT OFFICE 2,532,329

ANGLE LAYOUT AND CHECKING INSTRUMENT

Owen D. Premo, Muskegon Heights, Mich.

Application March 28, 1947, Serial No. 737,921

1 Claim. (Cl. 33—104)

This invention relates to angle layout and checking instruments.

One object of this invention is to provide an angle layout and checking instrument whereby it is possible to lay out or check any angle from zero degrees to 360 degrees without the necessity of making any adjustment of relatively movable parts, verniers, micrometers or the like.

Another object is to provide an angle layout and checking instrument comprising a polygon of distinctive outline having its side arranged at angles relatively to one another in increments a predetermined number of degrees, and having progressively inclined rectilinear openings within the instrument arranged at intervals up to said predetermined number of degrees, such that the user may lay out or check any angle from zero degrees to 360 degrees at intervals of one degree without requiring the assistance of any other instrument or measuring device, protractor or the like, other than possibly a T-square upon which to rest the instrument.

Another object is to provide an instrument for laying out and checking angles by means of a series of any number of adjacently-arranged rectilinear openings of progressively varying inclinations wherein there are no relatively movable or wearable parts, these openings being applicable to variously shaped instruments such as rectangles, triangles, polygons or combination instruments, for the use of draftsmen, machinists, carpenters, patternmakers, etc.

In the drawings:

Figure 1 is a top plan view of a layout and checking instrument, according to a preferred form of the invention;

Figure 2 is a side elevation of the instrument shown in Figure 1, with the lower right-hand corner broken away through one of the taper slots to show the construction thereof;

Figures 3 to 7 inclusive are individual diagrammatic views showing the manner in which the instrument of Figures 1 and 2 is employed to lay out or check angles in 15 degree ranges from 15 degrees to 90 degrees by one degree increments.

Figures 8, 10 and 11 are front elevations of the three parts of a modified angle layout and checking instrument;

Figure 9 is an end elevation of one of the parts shown in Figures 8, 10 and 11;

Figure 12 is a rear elevation of an angle extension device used in connection with the modification shown in Figures 8, 10 and 11 and shown in dotted lines in Figure 11; and Figure 13 is an end elevation of the extension device shown in Figure 12.

Referring to the drawings in detail, Figures 1 and 2 show a layout and checking instrument generally designated 10 according to a preferred form of the invention as consisting of a relatively thin plate of suitable material, such as transparent plastic or metal, of polygonal outline. It is preferred to make the instrument of transparent plastic for drafting room use and out of metal such as stainless steel for use by carpenters or mechanics. The instrument 10 is provided with two edges 11 and 12 at right angles to one another. A third edge 13 is arranged at an angle of 15 degrees to the edge 12 extended.

Arranged at right angles to the right-hand end of the edge 13 is an edge 14, which has an edge 15 arranged at its opposite end and at an angle of 15 degrees to its extension. Joined to the opposite end of the edge 15 at an angle of 15 degrees to the extension thereof is an edge 16 which continues almost to a junction with the edge 11 and is separated therefrom by a very short edge 17 parallel to the base edge 12 and perpendicular to the altitude edge 11. Thus the various edges 11 to 16 inclusive are arranged at intervals of 15 degrees such that any angle may be laid out or checked by 15 degree increments from 0° to 90° merely by using the two proper edges as explained below in connection with the use of the instrument. Since the perpendicular edges 11 and 12 may be used to lay out or check any angle from 0° to 360° by 90° increments, it will be obvious that any angle can be laid out or checked between 0° and 360° by 15 degree increments.

In order to cover the intervals between the 15 degree intervals by increments of 1 degree, the instrument is provided with 15 elongated slots designated 18 to 32 inclusive respectively and arranged at varying angles to the base edge, and preferably marked 1°, 2°, 3°, etc. to 15° on the instrument by 1 degree progressions. For example, the sides of the slot 18 are arranged at an angle of 1 degree relatively to the base edge 12, the sides of the slot 19 at 2 degrees, and so on, the sides of the slots 32 being arranged at 15 degrees relatively to the base edge 12. An additional slot 33 is optionally provided with its sides arranged at an angle of 22½ degrees in order to provide a quickly available half angle of 45 degrees, hence half of the angle between the altitude edge 11 and hypotenuse edge 16.

The instrument is also optionally provided with additional elongated slots 34 to 38 inclusive with their sides converging at angles equivalent to the standard tapers commonly used in machine shop practice such as ¼ inch to ¾ inch tapers per foot. The ¼ inch slot is used for laying out or checking pin reamers or pin-reamed holes such as are used for dowelling, for providing the necessary clearances on dies and for the tapers in gib keys. The ¾ inch taper is used for pipe threads. These tapered slots are useful in laying out machine parts employing such tapers, for example the sockets for drills, reamers or the like. An additional elongated tapered slot 39 is provided with a taper of 3½ inches per foot, which is the standard taper for milling machine spindles.

In the use of the instrument to lay out or check angles from 1° to 15°, the edge 12 is placed upon the reference line as shown in Figure 1, aided by a T-square if desired, and the proper slot 18 to 32 selected according to the angle desired. For example, if an angle of 6 degrees is desired, the slot 23 is used, whereas for an angle of 13 degrees, the slot 30 is selected. Conversely, to check an angle already laid out and lying between 0° and 15°, the reverse procedure is followed by laying the side 12 on the T-square as aligned with one side of the angle to be checked, and then moving the T-square up or down until one of the slots 18 to 32 coincides with the other side of the angle. The value of the angle is then read off directly on the number inscribed on the instrument at the left hand end of each slot. If the sides of the angle face in the opposite direction, the instrument is easily turned over so that the slots are inclined in the opposite direction.

To lay out or check angles from 15 to 30 degrees by one degree increments (Figure 3), the same procedure is followed except that the edge 13 is placed on the reference line and the proper slot 18 to 32 used either to lay out or to check an angle by one degree intervals from 16° to 30°. The edge 12 is of course used in conjunction with the edge 13 to lay out or check a 15° angle.

In a similar manner, angles from 30 to 45 degrees can be laid out or checked (Figure 4) by the use of the edge 16 as a base, angles from 45 to 60 degrees (Figure 5) by the use of the edge 15 as a base, angles of 60 to 75 degrees (Figure 6) by the use of the edge 14 as a base, and angles of 75 to 90 degrees (Figure 7) by the use of the altitude edge 11 as a base.

By using multiples of the 90 degree angles between the edges 11 and 12, angles in any of the other three quadrants can be checked or laid out by using a similar procedure but starting from 90 degrees, 180 degrees or 270 degrees. The use of the 22½ degree slot 33 is self-evident.

In order to lay out or check tapers, the tapered slots 34 to 39 inclusive are used. In laying out a known taper, the proper slot is selected according to the designation at the bottom of the taper, this being in inches or fractions thereof per foot. The slot 39, as previously stated, is used for laying out or checking the tapers on milling machine spindles and the slot 38 for pipe threads.

Thus it will be seen that the invention provides a single instrument which is completely self-contained, has no movable parts and requires no protractor yet which will measure or lay out any angle by one degree increments from 0° to 360°. Since there are no moving parts, there is nothing to wear appreciably or get out of order, or to vary over long periods of time. The simplicity of the instrument makes it inexpensive to manufacture and hence cheap to sell. The plate type angle layout and checking instruments may be precision made as fine as any gage, and the expense would be justified for their use in checking sine bars set up at various angles for machining operations.

The modification shown in Figures 8 to 13 inclusive consists essentially of three plates 40, 41 and 42 of thin material, either transparent or opaque and having elongated rectilinear slots 43, 44 and 45 respectively arranged at progressively increasing angles of inclination relatively to one of the sides of each plate 40, 41 or 42. Thus, the plates 40, 41 and 42 may be rectangular and each may contain a set of any number of slots that it will conveniently accommodate. For purposes of illustration, each plate 40, 41 and 42 is shown as containing fifteen such slots arranged at intervals of one degree of inclination. The slots in plate 40, for example, are arranged at inclinations of one to fifteen degrees, those of plate 41 from 16 to 30 degrees and those of plate 42 from 31 to 45 degrees. The slots thus also cover inclinations of 45 to 90 degrees merely by choosing a reference edge of the plate which is perpendicular to the reference edge used for angles between one degree and 45 degrees. In Figures 8, 10 and 11, therefore, the opposite ends of each slot have been designed with numerals representing the number of degrees of inclination with reference to these mutually perpendicular reference edges.

In order to facilitate the use of the elongated slots 43 and increase the accuracy of use thereof, the invention also provides the extension bar or straight edge generally designated 46 (Figures 12 and 13). The extension bar 46 consists of a strip of rigid material, either transparent or opaque with parallel elongated edges 47 and 48 and an elongated rib 49 secured thereto and having parallel edges. The rib 49 is of substantially the thickness of the plates 40, 41 and 42, and has a configuration conforming to that of the slots 43, 44 and 45 so as to fit snugly therein without wobbling. It will be obvious, however, that the parallel-sided slots 43, 44 and 45 may be used without the extension bar 46 for the layout and checking of angles.

The use of the modified angle layout and checking instrument shown in Figures 8, 10 and 11 is generally similar to that of the principal form of the invention shown in Figures 1 to 7 inclusive. In the modified instrument, however, the user selects the particular plate 40, 41 or 42 which has the angular inclination desired, either from being known beforehand or from inspection of the angle to be checked. The user then lays the plate down with one of its edges against a reference edge, such as a T-square, and either lays off the desired angle directly by choosing the proper slot 43, 44 or 45, or, if an angle is to be checked, tries one slot after another until a slot is found the sides of which exactly coincide with the side of the angle to be measured, the other side of the angle having been aligned with the reference edge of the plate.

The use of the extension bar 46 is supplementary to the use of the plates 40, 41 or 42 in that it extends the accuracy or range thereof. The rib 49 is merely slipped into the desired slot 43, 44 or 45, the edge 47 or 48 of the extension bar 46 being then used to lay out or check the angle instead of the sides of the slots 43, 44 or 45. It will also be evident that with a rib 49 corresponding in configuration to the slots 18 to 33 inclusive (Figure 1), the extension bar 46 may be used in conjunction with the angle layout and checking instrument 10 with the same manner of procedure.

What I claim is:

An angle layout and checking instrument for laying out and measuring angles comprising a polygonal plate-like member having an altitude edge, a base edge perpendicular to said altitude edge, one of said edges constituting a reference edge, an oblique base edge inclined at an angle of fifteen degrees relatively to said perpendicular base edge, a lower hypothenuse edge perpendicular to said oblique edge, a middle hypothenuse edge inclined at an angle of fifteen degrees relatively to said lower hypothenuse edge, an upper hypothenuse edge inclined at an angle of fifteen degrees to said middle hypothenuse edge, and a set of fifteen rectilinear angle guides disposed in fixed locations within said member and inclined at progressively increasing angles relatively to said reference edge by increments of one degree between adjacent guides.

OWEN D. PREMO.

REFERENCES CITED

The following references are of record in the file of this patent:

UNITED STATES PATENTS

| Number | Name | Date |
|---|---|---|
| 855,987 | Schlageter | June 4, 1907 |
| 1,268,756 | Nicole | June 4, 1918 |
| 1,699,619 | Muench | Jan. 22, 1929 |
| 1,755,024 | Sanden | Apr. 15, 1930 |
| 1,845,499 | Smith | Feb. 16, 1932 |
| 2,060,927 | Cristiani | Nov. 17, 1936 |

FOREIGN PATENTS

| Number | Country | Date |
|---|---|---|
| 1,564 | Great Britain | Jan. 10, 1910 |
| 422,553 | Germany | Dec. 7, 1925 |
| 490,745 | Germany | Jan. 31, 1950 |